US006533850B1

(12) United States Patent
Kaiser et al.

(10) Patent No.: US 6,533,850 B1
(45) Date of Patent: Mar. 18, 2003

(54) STABLE GELLED SURFACE POLISH

(76) Inventors: Conard E. Kaiser, 5817 Centralcrest, Houston, TX (US) 77092; Jock R. Collins, 5817 Centralcrest, Houston, TX (US) 77092; James R. Collins, 5817 Centralcrest, Houston, TX (US) 77092

( * ) Notice: Subject to any disclaimer, the term of this patent is extended or adjusted under 35 U.S.C. 154(b) by 147 days.

(21) Appl. No.: 09/794,891

(22) Filed: Feb. 26, 2001

Related U.S. Application Data

(60) Provisional application No. 60/184,567, filed on Feb. 24, 2000.

(51) Int. Cl.⁷ .............................. C09G 1/02; C09G 1/08; C09G 1/14; C09G 1/18
(52) U.S. Cl. ......................... 106/9; 106/10; 252/315.1; 252/315.4; 252/315.5; 252/315.6; 252/315.7; 510/383; 510/396; 510/403; 524/239; 524/247; 524/249; 524/556
(58) Field of Search ........................... 252/315.1, 315.4, 252/315.5, 315.6, 315.7; 510/383, 396, 403; 106/10, 9; 524/556, 239, 247, 249

(56) References Cited

U.S. PATENT DOCUMENTS 6,015,547 A * 1/2000 Yam .......................... 424/462

* cited by examiner

*Primary Examiner*—David W. Wu
*Assistant Examiner*—Kelechi C. Egwim
(74) *Attorney, Agent, or Firm*—Kenneth A. Roddy

(57) ABSTRACT

A smooth stable viscous gelled surface polish composition comprising a mixture of water, a gelling agent, a chelating agent, an abrasive, and colorant or pigment and other property enhancing additives evenly dispersed into the mixture, and an alkaline electrolyte viscosity increasing agent that raises the pH of the mixture and forms a smooth homogeneous stable gel with a viscosity level having the consistency of a custard or jelly which prevents separation of the abrasives and additives and does not require shaking or mixing prior to use. Additionally other suitable additives such as antioxidants, waxes, and oils may be used in the composition. The smooth homogeneous stable gel is also resistant to drying and the formation of a surface "skin".

17 Claims, No Drawings

STABLE GELLED SURFACE POLISH

CROSS REFERENCE TO RELATED APPLICATIONS

This application claims priority of U.S. Provisional Application Ser. No. 60/184,567 filed Feb. 24, 2000, the pendency of which is extended until Feb. 26, 2001 under 35 U.S.C. 119(e)(3). This application is closely related to U.S. patent application Ser. No. 09/307,502, filed on May 7, 1990, now U.S. Pat. No. 6,201,050 which is hereby incorporated by reference to the same extent as if fully set forth herein.

BACKGROUND OF THE INVENTION

1. Technical Field of the Invention

This invention relates generally to surface polishes of the type used for polishing metal wood, painted surfaces and other surfaces, and more particularly to a stable viscous gelled surface polish composition that contains abrasives and other additives in a gel base which prevents separation of the abrasives and additives and does not require shaking or mixing prior to use.

2. Brief Description of the Prior Art

Polishes for metal, wood, and other surfaces have long been known. The aqueous polishes are extremely effective and handy for use after shaking or mixing. However, they are difficult to use because their abrasive polishing additives commonly settle out of their liquid carriers in the storage containers. Because these products must use clays, starches, polysaccharides and other materials for the sole purpose of assisting in holding the desired abrasives in suspension although these additives serve no polishing purpose and commonly interfere with the polishing efficiency of the end product. Additionally the dried additives often accumulate on the insides of the storage container usually resulting in wastage of much of the contents after only partial use.

Making additives in the polish uniformly available when polishing is vital for consistent results. The consumer also desires to utilize the entire contents of the bottle, which cannot be done when a significant portion of the material adheres to the inside walls of the container and are unreachable in small-mouthed vessels. Polishes are usually sold in small-mouthed bottles to facilitate shaking as a method to insure thorough mixing. Small-mouthed containers will limit the amount of polish that can be efficiently removed without spillage and often limiting obtaining desired quantities for use.

The present invention overcomes the current problems associated with conventional polishes of the prior art. The present stable viscous gelled surface polish composition contains abrasives and other additives in a homogeneous gel base having a viscosity and consistency of a custard or jelly which prevents separation of the abrasives and additives and does not require shaking or mixing prior to use. Additionally, the gel base eliminates the need for additives that serve no purpose other than to attempt to keep the additives in suspension. The abrasive or polishing content may be individual abrasives or combinations of such materials as silicon dioxide, aluminum dioxide, cerium oxide, zirconium oxide, titanium oxide, manganese dioxide, diamond or iron based materials as well as many others. Additionally other suitable additives such as antioxidants, waxes, and oils may be used in the composition. The smooth homogeneous stable gel is also resistant to drying and the formation of a surface "skin".

SUMMARY OF THE INVENTION

It is therefore an object of this invention to provide homogenous non-settling polishes for surface polishing of metals, and other surfaces that do not have to be shaken or otherwise mixed prior to use.

It is another object of this invention to provide a stable viscous gelled surface polish that can be packaged it large-mouthed containers thereby facilitating application of the desired amount of polish to the cloth or buffing material.

Another object of this invention is to provide a stable viscous gelled surface polish that can be packaged it large-mouthed containers thereby allowing complete use of the container's contents which are easily reached.

Another object of this invention is to provide a stable viscous gelled surface polish that is resistant to drying thereby increasing ease of use.

Another object of this invention is to provide a stable viscous gelled surface polish that allows manufacturers and users a wider range of abrasives and additives than have been previously available because of the inability to evenly distribute and stabilize these materials in powders and liquids.

Another object of this invention is to provide a stable viscous gelled surface polish that allows the use of even heavy abrasives and additives that need not necessarily be finely ground and therefore can be used in more course form than previous products because the stable gel prevents their settling.

It is an additional object of this invention to provide a stable viscous gelled surface polish that allows storage and shipping of the gelled polishes in large volume containers because they do not have to be shaken, stirred, agitated, or otherwise mixed prior to use.

A further object of this invention is to provide a stable viscous gelled surface polish that allows the use of partial packages of gelled polishes with the knowledge that they will be consistent in quality and homogeneous in makeup no matter how much of the product was previously used.

A still further object of this invention to provide a stable viscous gelled surface polish that allows use of partial packages of gelled polishes with the knowledge that the remaining material will not readily dry so that the balance of the product will remain usable even when small quantities are present.

The above noted objects and other objects of the invention are accomplished by a smooth stable viscous gelled surface polish composition comprising a mixture of water, a gelling agent, a chelating agent, abrasives, pigments, and other property enhancing additives evenly dispersed into the mixture, and an alkaline electrolyte viscosity increasing agent that raises the pH of the mixture and forms a smooth homogeneous stable polish with a viscosity and consistency of a custard or jelly.

DETAILED DESCRIPTION OF A PREFERRED EMBODIMENT

In the following discussion each ingredient is added to water in the order listed and is completely dispersed and thoroughly mixed before adding the next ingredient. After thorough mixing, the mixture forms a stable homogeneous viscous gelled surface polish composition which has the consistency of a custard or jelly.

In producing the present ink compositions, a gelling agent such as a cross-linked polyacrylic acid is added to water in the ratio of from about 0.001% to about 10% by weight, and thoroughly mixed with a suitable mixer such as a Day type ribbon blender at about 50 to 70 rpm for about 5 minutes. The gelling agent lowers the pH of the water without significantly affecting its liquidity. The resultant free-flowing liquid state facilitates the addition of the desired abrasives and other additives. Then, from about 0.001% to about 5% by weight of a chelating agent, such as ethylene diamine tetraacetic acid (EDTA) is then added with continuous mixing, to be followed by the addition of the desired abrasives and other additives, discussed below. The chelating agent binds excess ions in the mixture. If the water is very hard, that it contains significant amounts of calcium or if the other additives to be added later contain high levels of cations, more of the chelating agent may be used to provide proper gelling. After the abrasives and other desired additives (discussed below) have been added and uniformly mixed and evenly dispersed with continuous mixing, from about 0.002% to about 3% by weight of a neutralizing agent or alkaline electrolyte such as ethanolamine or triethanolamine is added and thoroughly mixed in for about 20 minutes to obtain the desired viscosity and tack. The neutralizing agent or alkaline electrolyte adjusts the pH of the composition to produce a smooth stable homogeneous gelled polish having a viscosity and consistency of a custard or jelly.

In addition to the abrasives, the other property enhancing additives may include colorants or pigments, antioxidants, and waxes and oils. Any abrasive suitable for use in a water-based gel may be used in the present composition, such as silicon dioxide, aluminum dioxide, cerium oxide, zirconium oxide, titanium oxide, manganese dioxide, diamond based materials, and other iron based materials.

Any suitable colorant can be used to prepare polishes in accordance with the present invention. The colorant may be a dye or a pigment, organic or inorganic, as long as they are compatible with the gelling process. Some examples of suitable colorants include, but are not limited to, metallized azos such as barium or calcium salts, toluidines, naphthols, pyrazalones, rhodamines, quinacridones, phthalocyanines, phthalocyanines, carbazoles perylene pigments, pigments including the magnesium salts, lead chromes and silicochromates, zinc chromes, barium chromate, strontium chromate, titanium nickel yellow, liminites, haematites, magnetites. micaceous oxides of iron, siderite, iron pyrites, ferrites, and Prussian Blue to name a few colors (as opposed to shades—blacks or grays). Suitable carbon black colorants include channel black, furnace black, and lamp black.

Any suitable antioxidant compatible with the gelling process may also he used as an additive an amount sufficient to enhance the chemical stability of the surface polish composition, for example, from about 0.05% to about 0.20% by weight. Some examples of suitable antioxidants include, but are not limited to, butylated hydroxy toluene (BHT). propyl gallate. nordihydroguaiaretic acid, and trihydroxybutyrophenone.

The present gelled polish composition may also include any suitable wax or oil additives compatible with the gelling process to enhance the properties of the surface polish composition.

The present stable gelled polish is suitable for use in polishing silver, cold, jewelry, dishes and table ware, and similar products as well as metal, wood, and painted surfaces on automobiles, boats, furniture and other functional and decorative items. Viscosity of the formulation may be adjusted by altering the relative quantities of the gelling components. Abrasive particle size is relatively unimportant in storage stability in that the gelling process relatively easily compensates for, and efficiently suspends, almost any particle size fine enough to be used in surface polishes.

While this invention has been described fully and completely with special emphasis upon preferred embodiments, it should be understood that within the scope of the appended claims the invention may be practiced otherwise than as specifically described herein.

What is claimed is:

1. A stable viscous gelled surface polish composition, comprising a mixture of:
    water;
    a gelling agent in an effective amount sufficient to significantly lower the pH of the mixture;
    a organic chelating agent in an effective amount sufficient to bind excess ions in the mixture;
    an abrasive; and
    an alkaline electrolyte viscosity increasing agent in an effective amount sufficient to raise the pH of the mixture and form the mixture into a smooth homogeneous stable gel with a viscosity level having the consistency of a custard or jelly.

2. The viscous gelled surface polish composition according to claim 1, wherein
    the amount of said gelling agent is from about 0.001% to about 10% by weight.

3. The viscous gel led surface polish composition according to claim 1, wherein
    said gelling agent comprises a cross-linked polyacrylic acid.

4. The viscous gelled surface polish composition according to claim 1, wherein:
    said amount of organic chelating agent is from about 0.001% to about 5% by weight.

5. The viscous gelled surface polish composition according to claim 1, wherein,
    said organic chelating agent comprises ethylene diamine tetraacetic acid (EDTA).

6. The viscous gelled surface polish composition according to claim 1, wherein
    said amount of said alkaline electrolyte is from about 0.002% to about 3% by weight.

7. The viscous gelled surface polish composition according to claim 1, wherein
    said alkaline electrolyte is selected from the group consisting of ethanolamine, triethanolamine, a mixture of sodium hydroxide and water, and a dilute mixture of an amine component.

8. The viscous gelled surface polish composition according to claim 1, wherein
    the amount of abrasive comprises from about 0.5% to about 50% by weight.

9. The viscous gelled surface polish composition according to claim 1, wherein
    said abrasive is selected from the group consisting of silicon dioxide, aluminum dioxide, cerium oxide, zirconium oxide, titanium oxide, manganese dioxide, diamond based materials, and iron based materials.

10. The viscous gelled surface polish composition according to claim 1, further comprising,
    at least one property enhancing, additive evenly dispersed into the mixture in an amount sufficient to enhance the properties of the surface polish composition.

11. The viscous gelled surface polish composition according to claim 10, wherein
    said at least one property enhancing additive is selected from the group consisting of colorants, and antioxidants and waxes.

12. The viscous gelled surface polish composition according to claim 11, wherein the amount of said colorant an effective amount sufficient to produce a uniform color in the mixture.

13. The viscous gelled surface polish composition according to claim 11, wherein
said amount of said colorant is from about 5% to about 50% by weight.

14. The viscous gelled surface polish composition according to claim 11, wherein
said colorant is selected from the group consisting of organic dyes and pigments, and inorganic dyes and pigments.

15. The viscous gelled surface polish composition according to claim 11, wherein
the amount of said antioxidant is an effective amount sufficient to enhance the chemical stability of the surface polish composition.

16. The viscous gelled surface polish composition according to claim 15, wherein
said amount of said antioxidant is from about 0.05% to about 0.20% by weight.

17. The viscous gelled surface polish composition according to claim 11, wherein
said antioxidant is selected from the group consisting of butylated hydroxy toluene (BHT), nordihydroguaiaretic acid, propyl gallate and trihydroxybutyrophenone.

* * * * *